United States Patent [19]
Gaither

[11] Patent Number: 5,731,808
[45] Date of Patent: Mar. 24, 1998

[54] ERGONOMIC KEYBOARD

[76] Inventor: Joseph A. Gaither, P.O. Box 891, Ukiah, Calif. 95482-0891

[21] Appl. No.: 584,232

[22] Filed: Jan. 11, 1996

[51] Int. Cl.$^6$ ........................................ G09G 5/00
[52] U.S. Cl. ........................... 345/168; 400/489; 341/22
[58] Field of Search ........................ 345/168; 400/485, 400/488, 489, 492, 680; 341/20, 22, 24, 25

[56] References Cited

U.S. PATENT DOCUMENTS

| | | | |
|---|---|---|---|
| 5,073,050 | 12/1991 | Andrews | 400/489 |
| 5,228,791 | 7/1993 | Fort | 400/489 |
| 5,302,040 | 4/1994 | Louis | 345/168 |
| 5,502,460 | 3/1996 | Bowen | 345/168 |
| 5,543,790 | 8/1996 | Goldstein | 341/22 |
| 5,557,299 | 9/1996 | Maynard et al. | 345/168 |

*Primary Examiner*—Regina D. Liang

[57] ABSTRACT

An ergonomic computer keyboard is specially designed to allow a user to alter the line of key stroke in multiple directions. The keyboard housing is divided into three separate sections, and each section is connected to another by means of a cable. The dividing of the keyboard into three separate sections provides for a first adjustable positioning of the keys for the comfort of the user. A further adjustable positioning is facilitated by the shape of the keyboard housing since the housing is angled upwardly and is concave so that it curves up in the back. The keys are mounted perpendicular to it, and this has the effect of raising the keys at the back of the keyboard to a higher and more easily usable angle. A third adjustment of key stroke is afforded by the slidable displacement of the concavely-shaped keyboard upwardly or downwardly through the use of releasable fasteners so as to further vary key stroke alignment.

1 Claim, 3 Drawing Sheets

ERGONOMIC KEYBOARD

BACKGROUND OF THE INVENTION

1. Field of the Invention

The present invention relates to computer keyboards, and more particularly pertains to an ergonomic computer keyboard which has multiple degrees of adjustment.

2. Description of the Prior Art

The use of ergonomic computer keyboards is well known in the prior art, and this is evidenced by the granting of a number of patents relating to various functional and structural aspects of such keyboards. Known examples of pertinent patents relating to ergonomic computer keyboards include U.S. Pat. No. 5,073,050 which issued to Andrews on Dec. 17, 1991; U.S. Pat. No. 5,311,210 which issued to O'Brien et al on May 10, 1994; U.S. Pat. No. 5,318,367 which issued to Braun et al on Jun. 7, 1994; U.S. Pat. No. 5,339,097 which issued to Grant on Aug. 16, 1994; and U.S. Pat. No. 5,351,066 which issued to Rucker et al on Sept. 27, 1994.

While each of these prior art patents disclose ergonomic computer keyboards which fulfill their respective particular objectives and requirements, and are most likely quite functional for their intended purposes, it will be noticed that none of these patents disclose an ergonomic computer keyboard which includes multiple degrees of adjustable key alignment so as to misalign keys relative to one another on both horizontal and vertical planes. As such, there apparently still exists the need for ergonomic computer keyboards which provide for more angles of key alignment to improve the comfort of the user and in this respect, the present invention substantially fulfills this need.

SUMMARY OF THE INVENTION

In view of the foregoing disadvantages inherent in the known types of ergonomic computer keyboards now present in the prior art, the present invention provides a new ergonomic computer keyboard having advantages and improvements which are patentably distinct over similar devices and methods which may already be patented or commercially available. As such, the general purpose of the present invention, which will be described subsequently in greater detail, is to provide a ergonomic computer keyboard and method which has many of the advantages of the ergonomic computer keyboards mentioned heretofore while being operable to overcome problems not presently addressed by the prior art.

To attain this, the present invention generally comprises an ergonomic computer keyboard which is specially designed to allow a user to alter the line of key stroke in multiple directions. The keyboard housing is divided into three separate sections, and each section is connected to another by means of a cable. The dividing of the keyboard into three separate sections provides for a first adjustable positioning of the keys for the comfort of the user. A further advantage is provided by the shape of the keyboard housing since the housing is angled upwardly and is concave so that it curves up in the back. The keys are mounted perpendicular to it, and this has the effect of raising the keys at the back of the keyboard to a higher and more easily usable angle. Another adjustment of key stroke is afforded by the slidable displacement of the concavely-shaped keyboard upwardly or downwardly through the use of releasable fasteners so as to further vary key stroke alignment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ergonomic computer keyboard and method which has many of the advantages of the ergonomic computer keyboards mentioned heretofore and many novel features that result in a ergonomic computer keyboard which solves problems not presently addressed in the prior art.

It is another object of the present invention to provide a new ergonomic computer keyboard which may be easily and efficiently manufactured and marketed.

It is a further object of the present invention to provide a new ergonomic computer keyboard which is of a durable and reliable construction.

An even further object of the present invention is to provide a new ergonomic computer keyboard which is susceptible of a low cost of manufacture with regard to both materials and labor, and which accordingly is then susceptible of low prices of sale to the consuming public, thereby making such ergonomic computer keyboard economically available to the buying public.

Still yet another object of the present invention is to provide a new ergonomic computer keyboard which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF PREFERRED EMBODIMENTS

Figures 1, 2:
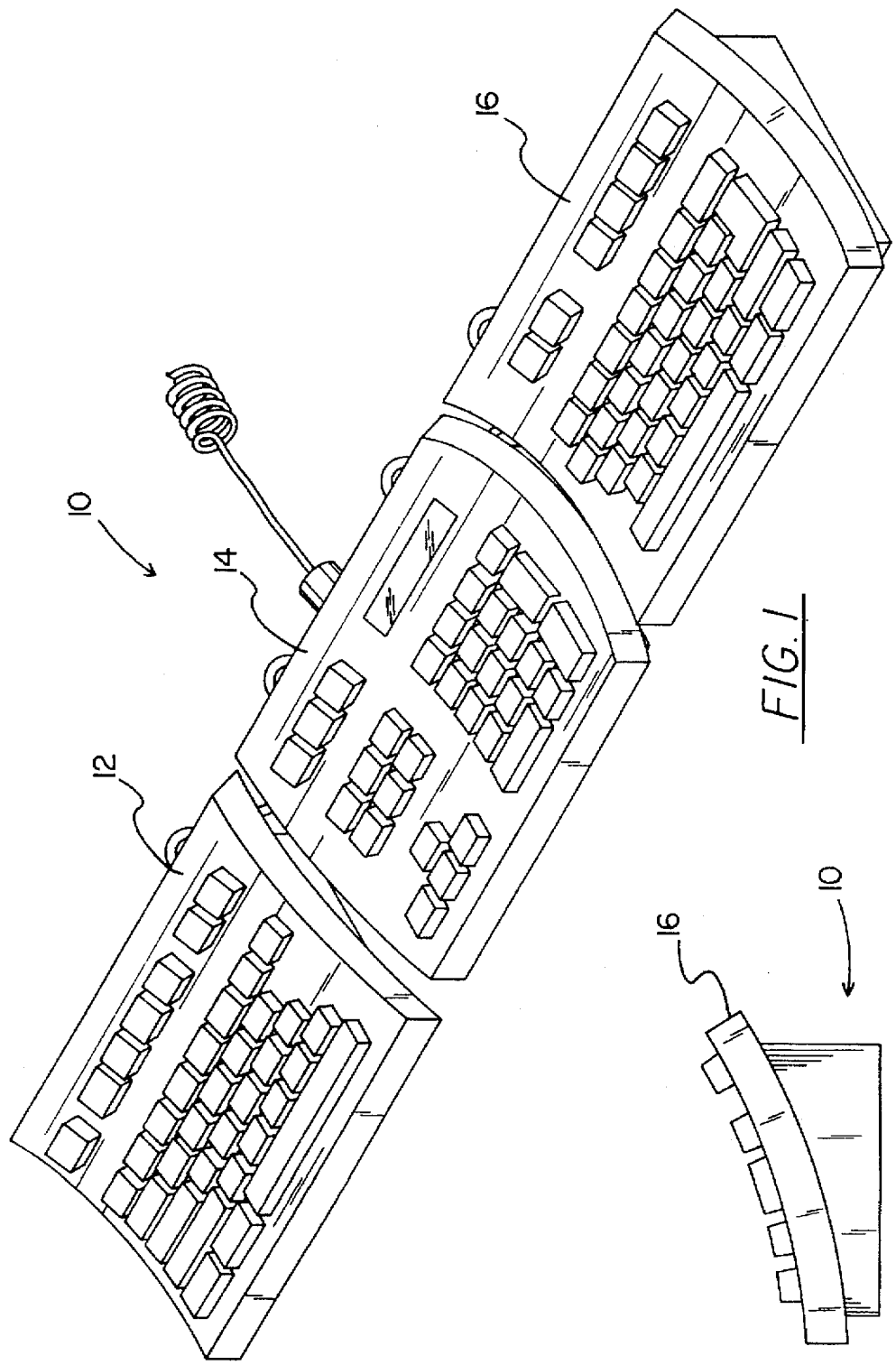
FIG. 1 is a perspective view of the ergonomic computer keyboard comprising the present invention.
FIG. 2 is an end elevation view thereof.

With reference now to the drawings, and in particular to FIGS. 1–6 thereof, a new ergonomic computer keyboard embodying the principles and concepts of the present invention and generally designated by the reference numeral 10 will be described.

Figures 3, 4:
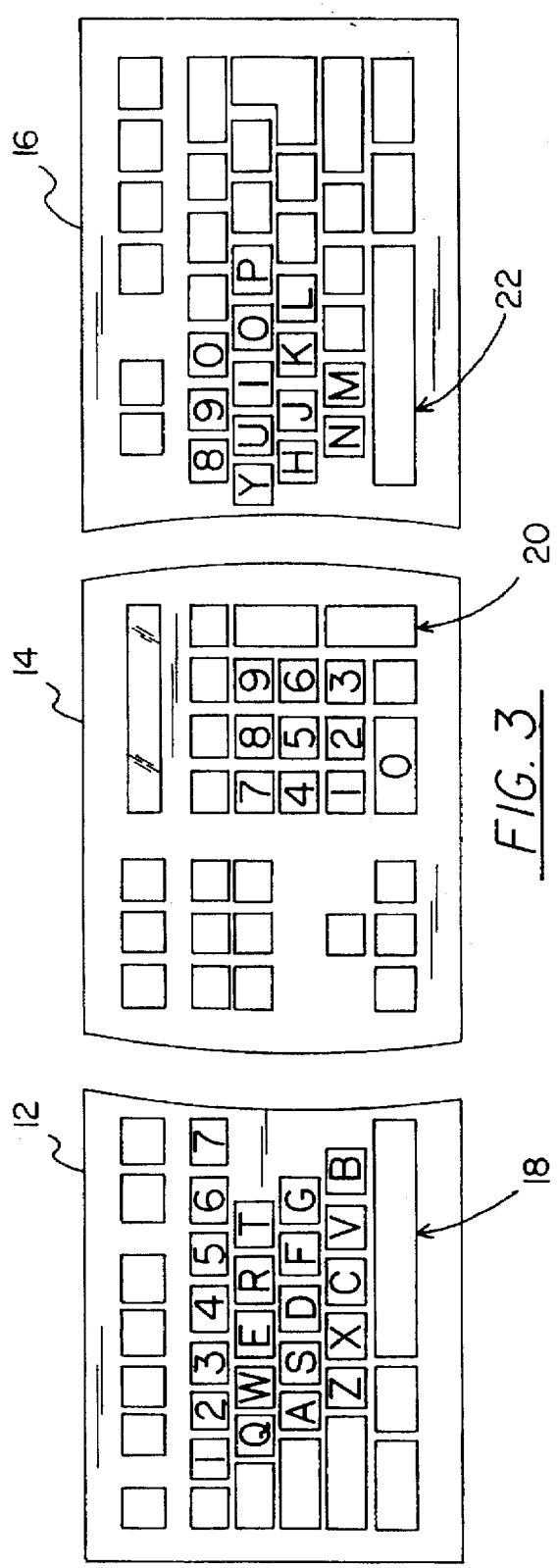
FIG. 3 is a top plan view thereof.
FIG. 4 is rear elevation view thereof.

More specifically, it will be noted that the ergonomic computer keyboard 10 in a preferred embodiment thereof essentially consists of three separate and independent keyboard sections 12, 14, 16. As shown in FIG. 3, the three sections 12, 14, 16 are each designed to have a plurality of keys 18, 20, 22 respectively contained thereon in a conventional manner, and as shown in FIG. 4, flexible computer cables 24, 26 are respectively connected between the sections 12, 14 and 14, 16 with a central cable 28 then being in communication with an attached computer in a known and conventional manner.

Figure 5:
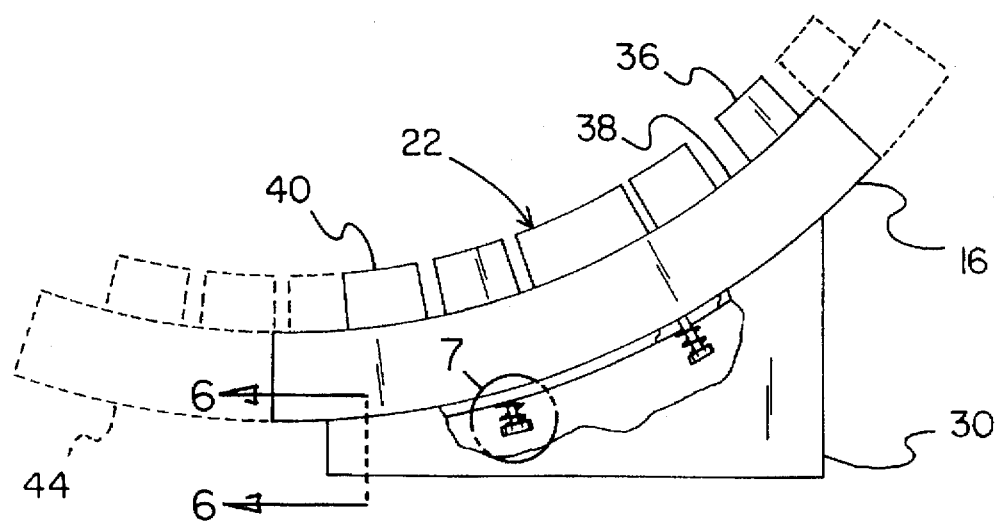
FIG. 5 is a cross-sectional view of the invention as viewed along the line 5—5 in FIG. 3, and this figure illustrates the adjustable positioning of a key pad relative to its base.

As indicated in FIGS. 1 and 5, it can be seen that each of the keyboards 12, 14, 16 are concavely-shaped and are slidably and adjustably disposed on respective support bases 30, 32, 34. In this regard, FIG. 5 illustrates keyboard section 16 mounted on base 30 with a plurality of keys 22 positioned thereon. It can be seen that a topmost key 36 will be orthogonally aligned with respect to a planar surface 38 of the keyboard section 16 with a bottommost key 40 being similarly orthogonally aligned with the curvilinear plane 38. As such, a key 36 located at a top portion of the keyboard 16 will be angled differently and will be higher than a key 40 located at a bottom section of the keyboard, thereby to provide a novel and very useful key alignment arrangement that is comfortable to a user.

Figure 6:
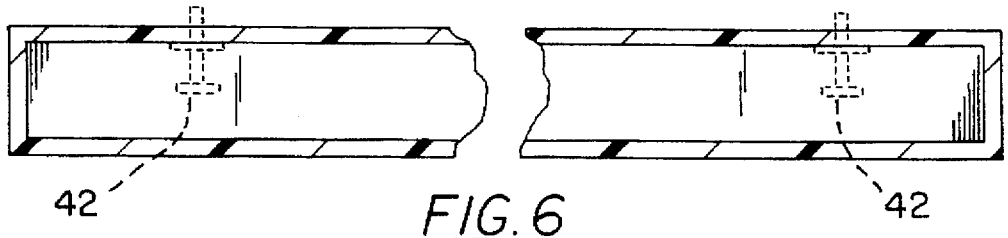
FIG. 6 is a cross-sectional view of the invention as viewed along the line 6—6 in FIG. 5.
Figure 7:
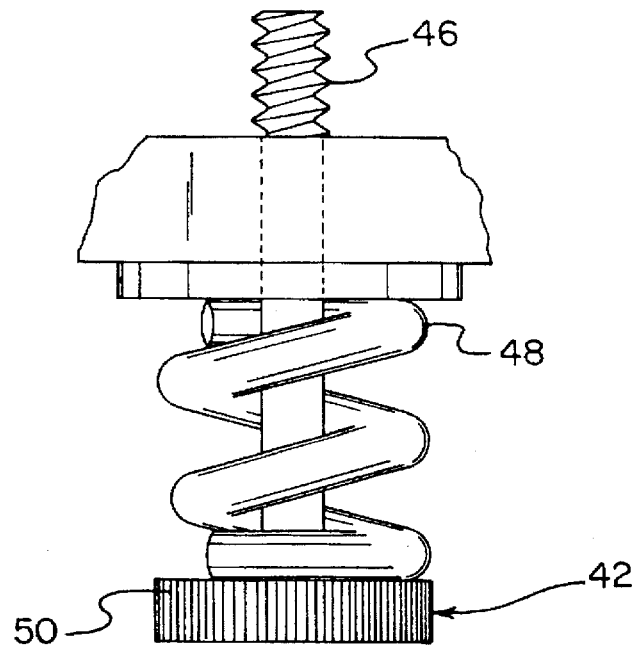
FIG. 7 is an enlarged detail view taken from FIG. 5 of the drawings.

Additionally, as shown in FIGS. 5–7, spring-biased threadably releasable connectors 42 operate to hold the keyboard section 16 in engagement with the base 30, with identical arrangements being employed for the keyboard sections 12, 14 and their respective bases 34, 32. As such, through a momentary release of a threaded connector 42, a keyboard section 16 can be slidably adjusted to a new position 44 as shown in FIG. 5, thereby to again vary the angular positioning and height of the keyboard section 22. This slidable movement of the section 16 relative to the base 30 provides for a third alignment of keys which can be employed to the benefit of a computer user.

Each threaded connector 42 has an externally threaded end 46 which is engageable with one of a plurality of apertures 47 in bottom-most sections of the keyboard sections 12, 14, 16, and a coiled compression spring 48 associated with each connector 42 operates as a biasing means to prevent an undesired rotation of the connector which could result in a keyboard section coming loose from its associated base. An end 50 of each connector 42 includes a knurled surface to facilitate a manual grasping and rotation of the connector by a computer operator, thereby to increase the ease of rapid and efficient adjustment to meet the needs of the operator.

In use, it can be seen that the ergonomic keyboard 10 is designed to provide three different key alignment positions. A first alignment is achieved by the individual spacing of the keyboard sections 12, 14, 16 relative to each other, wherein such spacing may include misalignment between the sections or even a positioning of the sections at different heights depending upon the desires of the computer operator. A second alignment function is fixed by design and involves the positioning of the individual keyboard sets 18, 20, 22 on a concave face of each respective keyboard section 12, 14, 16, whereby topmost keys are angled differently from bottommost keys since all keys are in perpendicular alignment with the curvilinear planes formed by the top surfaces of the concavely-shaped keyboard sections. A third alignment is achieved by the slidable movement of the individual keyboard sections 12, 14, 16 on their respective bases 34, 32, 30, thereby to position the keyboard sets 18, 20, 22 at either lower or higher angles.

In summary, it is recognized that one of the hazards of working with computers is the discomfort which develops in the neck, shoulders, and wrists from using a keyboard. Diseases, such as carpal tunnel syndrome, are common results from long periods of use. The present invention 10 helps to alleviate these problems by changing the line of stroke and enabling the individual user to arrange the keyboard sections 12, 14, 16 in the most comfortable manner. The variations of alignment are numerous due to the three different alignment options and if mostly numeric data is being entered, it might be more convenient to have the numeric keypad in the center of the keyboard 10. Unlike standard keyboard housings which are set at an angle, the three sections 12, 14, 16 of the present invention 10 are angled and concavely-shaped with the keys being mounted so that they are perpendicular to the individual sections, thus having the effect of raising the keys at the back of the keyboard to a higher angle to meet the desires of the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved ergonomic computer keyboard for use with a computer comprising:

a first keypad section;

a second keypad section connected to said first keypad section by a first data transfer cable;

a third keypad section connected to said second keypad section by a second data transfer cable and being further selectively connectable to said computer by a third data transfer cable, said first, second and third keypad sections being independently positionable relative to one another so as to provide a first adjustable positioning means for said keyboard and having an upwardly directed concave shape, wherein keys on said first, second and third keypad sections are positioned across said concave shape, wherein said keys are substantially perpendicularly aligned with a curvilinear plane defined by a top surface of said concave shape on said first, second and third keypad sections; and additional adjustable positioning means, said additional adjustable positioning means including a selectively changeable positioning of said first, second and third keypad sections on respective first, second and third bases supportingly attached thereto, wherein said additional changeable positioning of said first, second and third keypad sections is a slidable height-wise positioning;

wherein spring-biased releasable fasteners are used to attach said first, second and third keypad sections to their respective first, second and third bases, each spring-biased releasable fastener having an externally threaded end which is engageable with one of a plurality of apertures in bottommost sections of the keypad sections, a coiled compression spring associated with each fastener operating as a biasing means to prevent an undesired rotation of the fastener, and a knurled surface to facilitate a manual grasping and rotation of the fastener by a computer operator;

wherein the second keypad is a numeric key pad that is adapted to be situated between the first and third keypads for use during heavy entry of numeric data.

* * * * *